United States Patent
Xiang et al.

(10) Patent No.: US 10,197,426 B2
(45) Date of Patent: Feb. 5, 2019

(54) METERING DEVICE AND METERING METHOD FOR METERING CARBON DIOXIDE FLOW

(71) Applicant: Shaoxing Huachuang Polyurethane Co. Ltd., Shaoxing, Zhejiang (CN)

(72) Inventors: Minghua Xiang, Zhejiang (CN); Jun Zhang, Zhejiang (CN); Weijiang Zhang, Zhejiang (CN)

(73) Assignee: SHAOXING HUACHUANG POLYURETHANE CO. LTD., Shaoxing (CN)

( * ) Notice: Subject to any disclaimer, the term of this patent is extended or adjusted under 35 U.S.C. 154(b) by 8 days.

(21) Appl. No.: 15/698,716

(22) Filed: Sep. 8, 2017

(65) Prior Publication Data

US 2018/0209832 A1 Jul. 26, 2018

Related U.S. Application Data

(63) Continuation of application No. PCT/CN2017/094023, filed on Jul. 24, 2017.

(30) Foreign Application Priority Data

Jan. 25, 2017 (CN) .......................... 2017 1 0062607

(51) Int. Cl.
*G01F 11/02* (2006.01)
*G01F 15/06* (2006.01)
(Continued)

(52) U.S. Cl.
CPC ............. *G01F 11/021* (2013.01); *C08J 9/122* (2013.01); *F04B 13/00* (2013.01); *F04B 15/08* (2013.01); *F04B 53/1002* (2013.01); *G01F 15/06* (2013.01); *G01F 15/18* (2013.01); *C08J 2203/06* (2013.01); *C08J 2375/08* (2013.01);
(Continued)

(58) Field of Classification Search
CPC ...... F04B 13/00; F04B 9/06; F04B 2015/081; F04B 53/16; F04B 43/067; F02C 9/263; F02C 9/30; A61M 5/14216
See application file for complete search history.

(56) References Cited

U.S. PATENT DOCUMENTS

| | | | |
|---|---|---|---|
| 2011/0008189 A1* | 1/2011 | Nguyen | F04B 9/127 417/399 |
| 2012/0216671 A1* | 8/2012 | Gammon | F04B 13/00 91/422 |

(Continued)

*Primary Examiner* — Reinaldo Sanchez-Medina
*Assistant Examiner* — Nicole Gardner
(74) *Attorney, Agent, or Firm* — SZDC Law P.C.

(57) ABSTRACT

A metering device and metering method for metering carbon dioxide flow belong to the technical field of preparation of polyurethane foam materials. The metering device of the present invention has a simple structure and a small size, can accurately control the amount of the delivered liquefied carbon dioxide; meanwhile, one end of the metering pump is connected with the sliding block, and the sliding block can move on the transverse plate, thus changing the vertical movement stroke of the piston rod and changing the flow volume of the carbon dioxide. The cylinder of the metering pump of the present invention is internally provided with the water passages, and a coolant can be filled into the water passages to keep the temperature of the carbon dioxide constant.

6 Claims, 9 Drawing Sheets

(51) Int. Cl.
    *G01F 15/18*     (2006.01)
    *F04B 13/00*     (2006.01)
    *C08J 9/12*     (2006.01)
    *F04B 15/08*     (2006.01)
    *F04B 53/10*     (2006.01)
    *F04B 53/08*     (2006.01)
    *F04B 53/14*     (2006.01)
    *F04B 53/16*     (2006.01)

(52) U.S. Cl.
    CPC ............... *F04B 53/08* (2013.01); *F04B 53/10* (2013.01); *F04B 53/144* (2013.01); *F04B 53/16* (2013.01)

(56) References Cited

U.S. PATENT DOCUMENTS

| | | | |
|---|---|---|---|
| 2015/0135944 A1* | 5/2015 | Muth | F04B 39/0005 92/80 |
| 2016/0230750 A1* | 8/2016 | Boehmer | F04B 11/0033 |
| 2017/0138913 A1* | 5/2017 | Nocon | F04B 9/00 |

\* cited by examiner

METERING DEVICE AND METERING METHOD FOR METERING CARBON DIOXIDE FLOW

The present application is a continuation application of PCT/CN2017/094023, field on Jul. 24, 2017, which claims priority to Chinese Patent Application No. 201710062607.6, filed on Jan. 25, 2017, both of which are incorporated by reference for all purposes as if fully set forth herein.

BACKGROUND OF THE INVENTION

Technical Field

The present invention relates to the technical field of the preparation of polyurethane foam materials, and specifically relates to a metering device and metering method for metering carbon dioxide flow.

Description of Related Art

Polyurethane (PU in short) is a macromolecular polymer which is generated through a polymerization reaction of isocyanate and polyols. A foaming machine is also called a foam generator, which is a piece of equipment capable of making foam by using chemical raw materials with a certain concentration and condensing the foam into a solid. The foaming machine is a core component of the polyurethane foam plastic processing equipment. The foaming machine homogeneously mixes two different chemical raw materials (isocyanate and polyols) by respective ratios and sprays the mixed materials at a high pressure. The mixed raw materials perform a vigorous chemical reaction in air to generate a huge amount of foam, thus greatly expanding in size. After a period of time, the mixed raw materials exposed in air are condensed to generate a solid with a huge amount of foam (polyurethane foam).

Polyurethane foam has very high strength, and good anti-impact, soundproof and heat-proof performance. The polyurethane foam has been widely applied in various fields, such as refrigerators, freezers, furniture manufacturing, wall heat insulation, etc. The existing polyurethane foaming agent is HCFC-141b, but the ODP (Ozone Deplete Potential) of the HCFC-141b is not zero, so HCFC-141b is a transitional substitute. In accordance with the regulations of the Montreal Protocol on Substances that Deplete the Ozone Layer, the use of HCFC-141b will be completely banned in 2020 in developed countries and in 2040 in developing countries. In recent years, the voices of accelerating elimination of the HCFC substances have become louder and louder in the domestic ozone layer protection conferences. The banning time of the HCFC-141b is greatly advanced. Therefore, a green, environmentally-friendly and economical foaming agent is needed to replace HCFC-141b.

Carbon dioxide is an environmental friendly "three-atom" substance, which is low in price and widely sourced and has a zero ODP value, thus drawing a lot of attention. However, carbon dioxide exists in a gaseous state at room temperature and under normal pressure, so the cost and difficulties of use of the carbon dioxide are increased. Therefore, it is necessary to develop the technology of making the polyurethane foam by using carbon dioxide as a foaming agent to replace HCFC-141b.

BRIEF SUMMARY OF THE INVENTION

The present invention provides a metering device and metering method for metering carbon dioxide flow for the main purpose of solving the technical problems in the prior art.

The present invention adopts the following technical solutions to solve the technical problems. A metering device for metering carbon dioxide flow includes a transverse plate, a metering pump, and a mounting plate. The transverse plate is provided with a scale. The transverse plate is provided with a sliding block. The sliding block is provided with a pointer. The mounting plate is formed with a plurality of bolt holes. The metering pump is connected with the mounting plate through bolts, and one end of the metering pump is connected with the sliding block. The metering pump includes a cylinder, an upper cover, a piston rod, a cylinder sleeve and an inner one-way valve, wherein the cylinder is internally provided with an accommodating cavity; the cylinder sleeve is disposed in the accommodating cavity; the upper cover is connected with the cylinder through a hexagon socket screw; the upper cover is connected with an upper cover interface; the upper cover interface is embedded in the cylinder, and the bottom of the upper cover interface touches the top of the cylinder sleeve. The upper cover interface is formed with a carbon dioxide discharge hole. The cylinder is internally provided with a No. 1 discharge pipe. The carbon dioxide discharge hole communicates with the No. 1 discharge pipe. The upper cover is formed with an annular groove at the bottom and an inner threaded hole on the top. An upper cover nut is disposed at the inner threaded hole. The upper cover nut is formed with a hole. The upper cover nut is connected with a nut interface. The outer wall of the nut interface is formed with external screw threads. The inner threaded hole on the upper cover is matched with the nut interface. The nut interface is screwed and embedded into the inner threaded hole. The two ends of the piston rod are respectively provided with screw threads. The piston rod is divided into a piston upper part and a piston lower part; the piston upper part and the piston lower part are both circular columns; and the diameter of the piston upper part is a little greater than the diameter of the piston lower part. The piston rod is disposed in the cylinder sleeve. The piston upper part passes through the upper cover interface, the upper cover, the nut interface and the upper cover nut in turn, and the end portion of the piston upper part extends out of the upper cover nut. The piston upper part is sleeved with a flat gasket and a spring. The flat gasket and the spring are disposed in the upper cover interface. The piston lower part is sleeved with a flat gasket, a spring, a premixed seal and an M5 nut in turn from the top down. The flat gasket and the cylinder sleeve form an upper pump cavity and a lower pump cavity. The upper pump cavity communicates with the carbon dioxide discharge hole on the upper cover interface. The cylinder is formed with a carbon dioxide inlet and a carbon dioxide outlet at the bottom. The inner one-way valve is formed with screw threads. The inner one-way valve is screwed and embedded into the carbon dioxide inlet and outlet. The carbon dioxide outlet also communicates with the No. 1 discharge pipe.

As an optimization, the inner one-way valve includes an inner one-way valve body, a valve core, an inner one-way valve base; the inner one-way valve base is screwed together with the inner one-way valve body; the valve core is disposed in the inner one-way valve body; a check ball is disposed between the inner one-way valve base and the valve core; and a spring is disposed between the valve core and the inner one-way valve body.

As an optimization, the two inner one-way valves are connected with a No. 2 discharge pipe there-between, and the No. 2 discharge pipe communicates with the lower pump cavity.

As an optimization, the cylinder is formed with a water passage entrance and a water passage exit on the outer wall; the cylinder is internally formed with three water passages; the water passages are not connected with one another, but communicate with one another in the annular groove at the bottom of the upper cover.

As an optimization, the cylinder is also formed with a plurality of auxiliary holes on the outer wall, and chock plugs are disposed at the auxiliary holes.

A method for metering carbon dioxide flow includes the following steps:

(1) pulling the piston rod to move the piston rod upward, wherein in this process, the lower pump cavity is internally vacuumed, the inner one-way valve at the carbon dioxide inlet opens while the inner one-way valve at the carbon dioxide outlet closes, and liquefied carbon dioxide flows into the lower pump cavity via the No. 2 discharge pipe;

(2) pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet; wherein the carbon dioxide outlet communicates with the No. 1 discharge pipe, so a part of the liquefied carbon dioxide in the lower pump cavity passes through the No. 1 discharge pipe and the carbon dioxide discharge hole in turn and then flows into the upper pump cavity;

(3) pulling the piston rod to move the piston rod upward, wherein in this process, the lower pump cavity is internally vacuumed, the inner one-way valve at the carbon dioxide inlet opens while the inner one-way valve at the carbon dioxide outlet closes, the liquefied carbon dioxide flows into the lower pump cavity via the No. 2 discharge pipe, and at the same time, the liquefied carbon dioxide in the upper pump cavity passes through the carbon dioxide discharge hole and the No. 1 discharge pipe in turn and flows out of the carbon dioxide outlet;

(4) pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet, and a part of the liquefied carbon dioxide in the lower pump cavity passes through the No. 1 discharge pipe and the carbon dioxide discharge hole in turn and flows into the upper pump cavity;

(5) pulling the piston rod repeatedly such that the piston rod moves up and down in a reciprocating way to deliver the liquefied carbon dioxide quantitatively.

A polyurethane foaming machine corresponding to the metering device includes an isocyanate branch, a premixed polyether branch, a carbon dioxide branch, and a premixing spray gun; the isocyanate branch consists of an isocyanate tank, an isocyanate equipment tank, a primary feed pump, a secondary feed pump and an isocyanate delivery pipe; the premixed polyether branch consists of a premixed polyether tank, a premixed polyether equipment tank, a primary feed pump, a secondary feed pump and a premixed polyether delivery pipe; and the carbon dioxide branch includes a carbon dioxide tank, a carbon dioxide equipment tank, a booster pump, a metering device and a carbon dioxide delivery pipe. At the entrance of the premixed polyether equipment tank, the carbon dioxide delivery pipe communicates with the premixed polyether delivery pipe. The carbon dioxide is dissolved in the premixed polyether to generate a mixture. The isocyanate and the mixture are converged in the premixing spray gun through the delivery pipe. The secondary feed pump and the metering device are controlled by the same driver.

As an optimization, the isocyanate equipment tank and the premixed polyether tank are respectively internally provided with a heating device, and a pressure switch is respectively disposed at the entrance of the isocyanate equipment tank and at the entrance of the premixed polyether equipment tank.

As an optimization, the carbon dioxide branch also includes a reducing valve, a one-way valve and two solenoid valves; the reducing valve and one of the solenoid valves are disposed between the carbon dioxide equipment tank and the booster pump in turn; the other one of the solenoid valves is disposed between the metering pump mechanism and the carbon dioxide equipment tank; and the one-way valve is disposed at the rear end of the metering device.

As an optimization, the carbon dioxide equipment tank is respectively provided with a compressor, a cooler and a throttle valve.

As an optimization, the booster pump is connected with a pressure sensor.

As an optimization, a pressure control valve and a pressure sensor are in connection with and located between the premixed polyether equipment tank and the premixing spray gun.

A method for making polyurethane foam using the polyurethane foaming machine includes the following steps:

(1) decompressing a great amount of liquefied carbon dioxide and a small amount of gasified carbon dioxide which exists in the carbon dioxide tank by using the reducing valve to generate carbon dioxide gas, and pumping the carbon dioxide gas into the carbon dioxide equipment tank by using the booster pump;

(2) starting the compressor and cooler on the carbon dioxide equipment tank such that the compressor and cooler compress, cool and continuously liquefy the carbon dioxide gas, and when the carbon dioxide equipment tank reaches a certain pressure inside, controlling the booster pump to stop working by the pressure sensor;

(3) pumping the liquefied carbon dioxide in the carbon dioxide equipment tank into the premixed polyether delivery pipe in a fixed ratio by using the metering pump, dissolving the carbon dioxide in the polyether to form a mixture; starting the metering pump to work while starting the secondary feed pump also to work; pumping the isocyanate in the isocyanate tank into the isocyanate equipment tank by using the primary feed pump and the secondary feed pump; pumping the premixed polyether in the premixed polyether tank into the premixed polyether equipment tank by using the primary feed pump and the secondary feed pump, wherein the metering pump and the secondary feed pump are controlled by the same driver to deliver the isocyanate, premixed polyether and carbon dioxide into an equipment tank at the same time;

(4) starting the heating devices on the isocyanate equipment tank and the premixed polyether equipment tank to respectively heat and thin the isocyanate and the carbon dioxide-contained premixed polyether such that the isocyanate and the carbon dioxide-contained premixed polyether are mixed well; (5) respectively delivering the isocyanate and the carbon dioxide-contained premixed polyether to the premixing spray gun at a fixed ratio, mixing the delivered materials well, and spraying the mixture, wherein after a period of time, the spray is cured to form the polyurethane foam.

The present invention has the following beneficial effects:
1. The metering device of the present invention has a simple structure and a small size, can accurately control the amount of the delivered liquefied carbon dioxide; meanwhile, one end of the metering pump is connected with the sliding block, and the sliding block can move on the transverse plate, thus changing the vertical movement stroke of the piston rod and changing the flow volume of the carbon dioxide. 2. The cylinder of the metering pump of the present invention is internally provided with the water passages, and a coolant can be filled into the water passages to keep the temperature of the carbon dioxide constant. 3. The present invention adopts the same driver to control the metering device and the secondary feed pump, and then the isocyanate, the premixed polyether and the liquefied carbon dioxide are output at the same time to prevent affecting the polyurethane foam quality due to a shortage in a some certain raw material. 4. In the present invention, the carbon dioxide is liquefied through the carbon dioxide equipment tank such that the carbon dioxide keeps the liquefied state in the metering, delivering, and mixing processes; the liquid carbon dioxide is easily dissolved in the polyether, and then the mixing ratio of the liquefied carbon dioxide and the premixed polyether are not affected by external environmental factors, thus preventing affecting the polyurethane foam quality due to too high or low external temperature. 5. The isocyanate and the premixed polyether are viscose liquid, and by setting a plurality of feed pumps, the isocyanate or the premixed polyether can be delivered more efficiently. 6. By using the present invention, the polyurethane foam can be made on site or can be pre-manufactured, so the construction site is not limited. 7. The present invention adopts carbon dioxide to replace HCFC-141b; the carbon dioxide is low in price, non-toxic and inflammable, reducing the polyurethane foam production cost of enterprises; and the carbon dioxide is more environmentally-friendly and widely sourced, thus ensuring no ozone consumption and improving the greenhouse effect.

As shown in the figures, 1. Isocyanate tank; 2. Premixed polyether polyol tank; 3. Carbon dioxide tank; 4. Isocyanate equipment tank; 5. Premixed polyether polyol equipment tank; 6. Carbon dioxide equipment tank; 7. Primary feed pump; 8. Secondary feed pump; 9. Isocyanate delivery pipe; 10. Premixed polyether polyol delivery pipe; 11. Booster pump; 12. Metering device; 13. Carbon dioxide delivery pipe; 14. Premixing spray gun; 15. Heating device; 16. Pressure switch; 17. Reducing valve; 18. One-way valve; 19. Solenoid valve; 20. Compressor; 21. Cooler; 22. Throttle valve; 23. Pressure sensor; 24. Transverse plate; 25. Metering pump; 26. Mounting plate; 27. Scale; 28. Sliding block; 29. Pointer; 30. Bolt hole; 31. Cylinder; 32. Upper cover; 33. Piston rod; 34. Cylinder sleeve; 35 Inner one-way valve; 36. Hexagon socket screw; 37. Upper cover interface; 38. Carbon dioxide discharge hole; 39. No. 1 discharge pipe; 40. Inner threaded hole; 41. Upper cover nut; 42. Hole; 43. Nut interface; 44. Piston upper part; 45. Piston lower part; 46. Flat gasket; 47. Spring; 48. Premixed seal; 49. M5 nut; 50. Upper pump cavity; 51. Lower pump cavity; 52. Carbon dioxide inlet; 53. Carbon dioxide outlet; 54. Inner one-way valve body; 55. Valve core; 56. Inner one-way valve base; 57. Check ball; 58. No. 2 discharge pipe; 59. Water passage entrance; 60. Water passage exit; 61. Water passage; 62. Auxiliary hole; 63. Choke plug; 64. Pressure control valve; 65. Annular groove.

DETAILED DESCRIPTION OF THE INVENTION

The technical solution of the present invention is described in further detail in conjunction with the embodiments and attached drawings.

Figure 1:
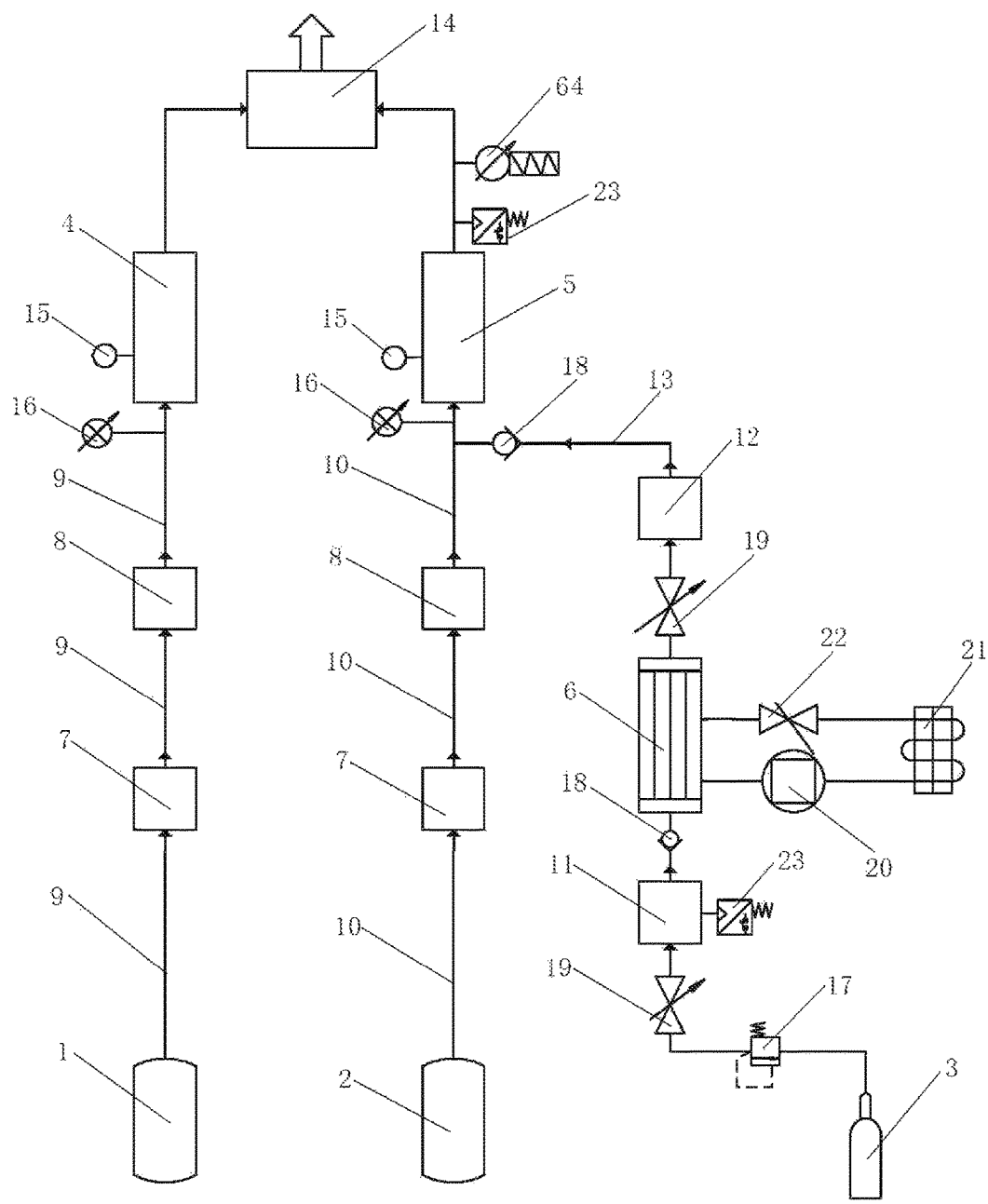
FIG. 1 is a structural view of a polyurethane foaming machine of the present invention.
Figure 2:
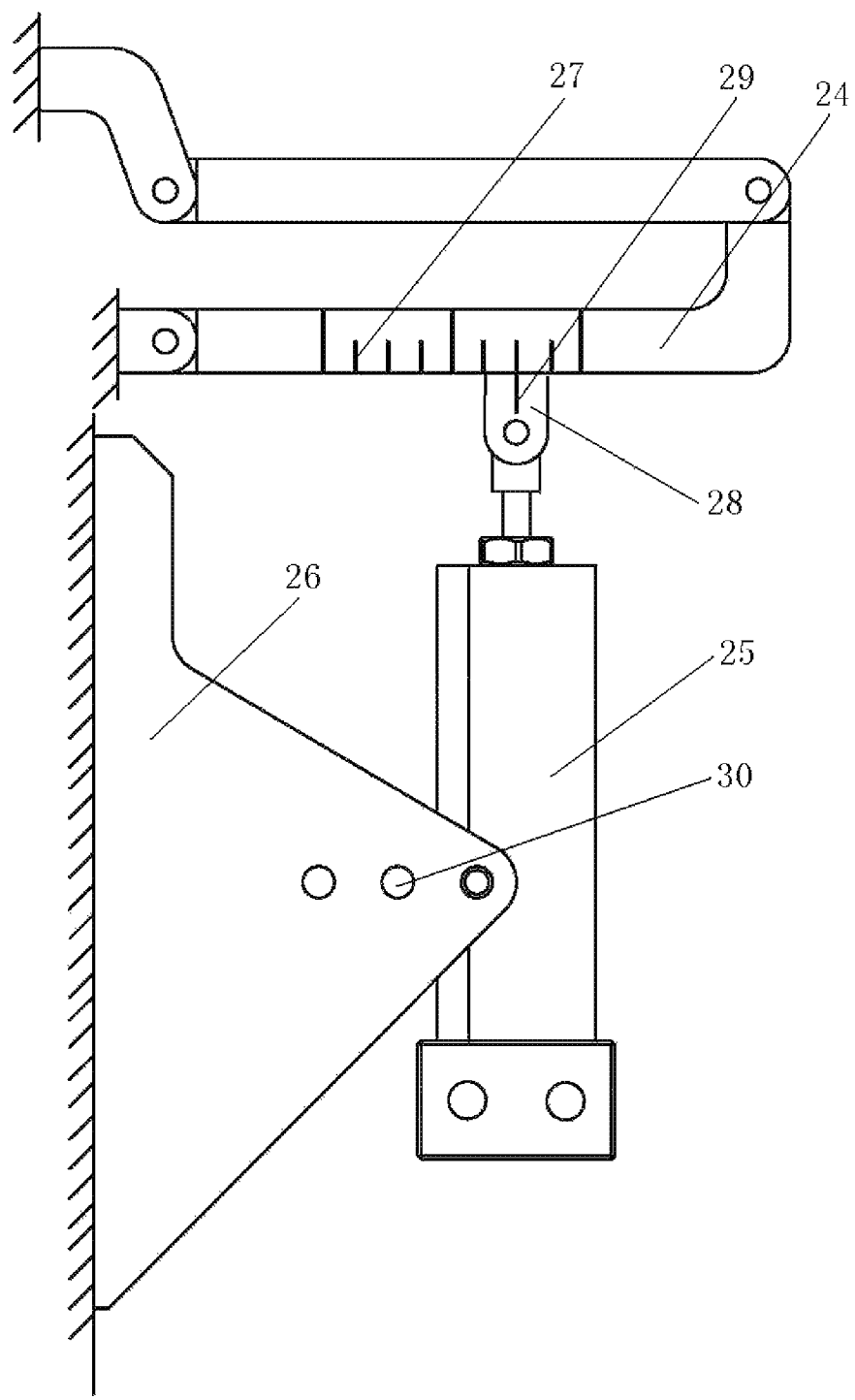
FIG. 2 is a structural view of a metering device of the present invention.
Figure 3:
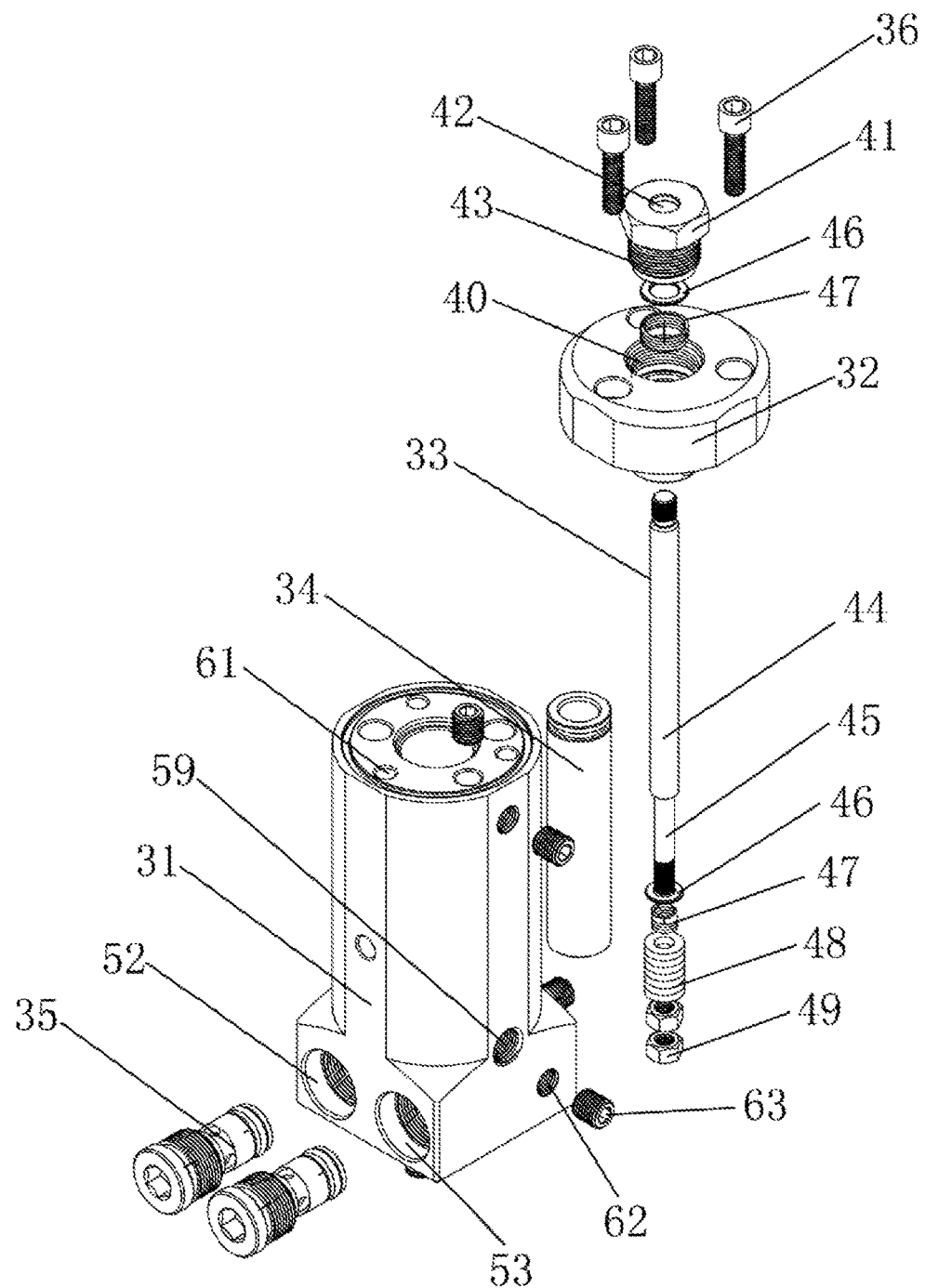
FIG. 3 is a structural view of a metering pump of the present invention.
Figure 4:
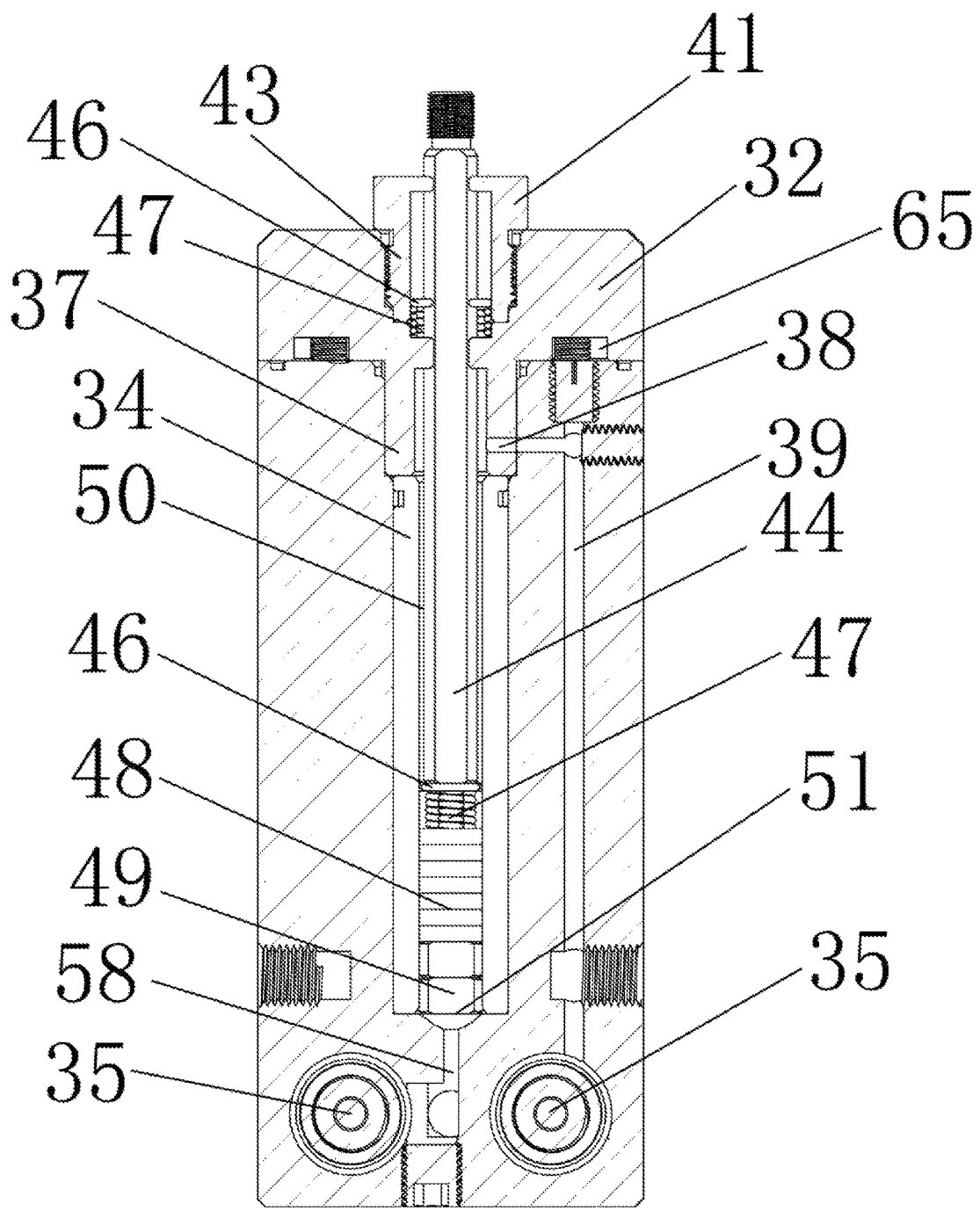
FIG. 4 is a sectional view of the metering pump of the present invention.
Figure 5:
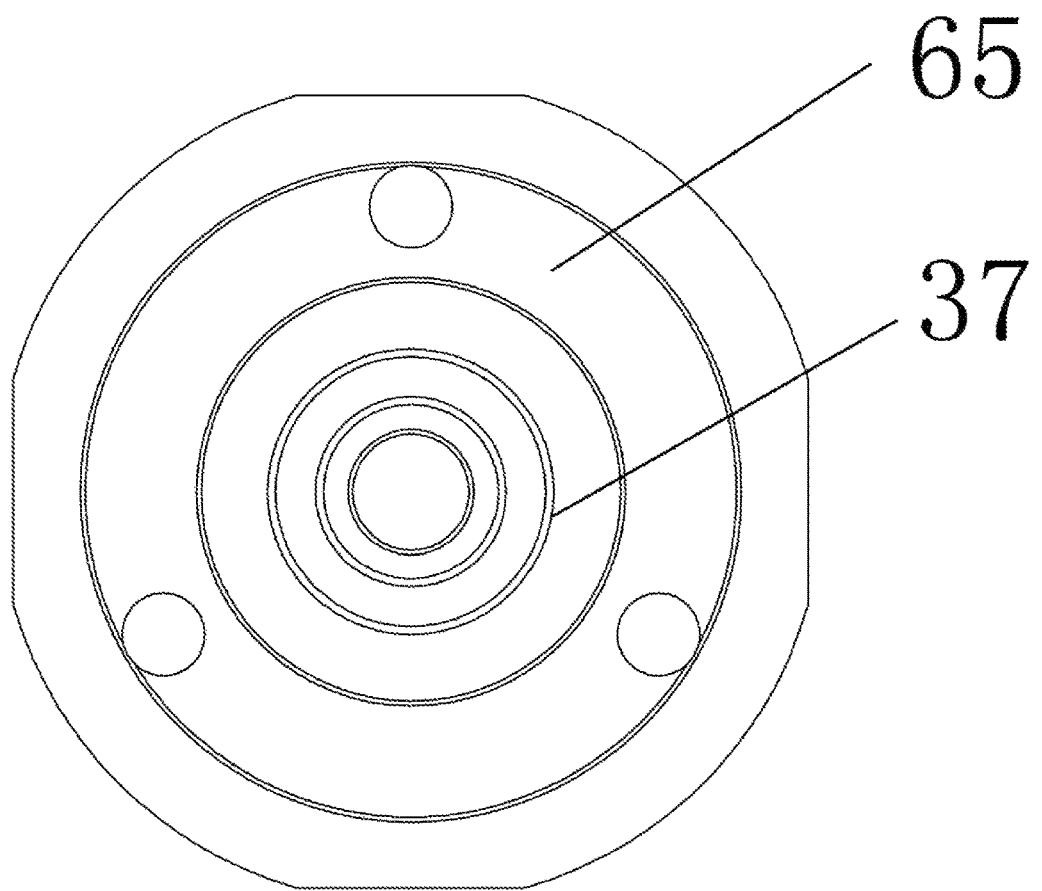
FIG. 5 is a bottom view of an upper cover of the present invention.
Figure 6:
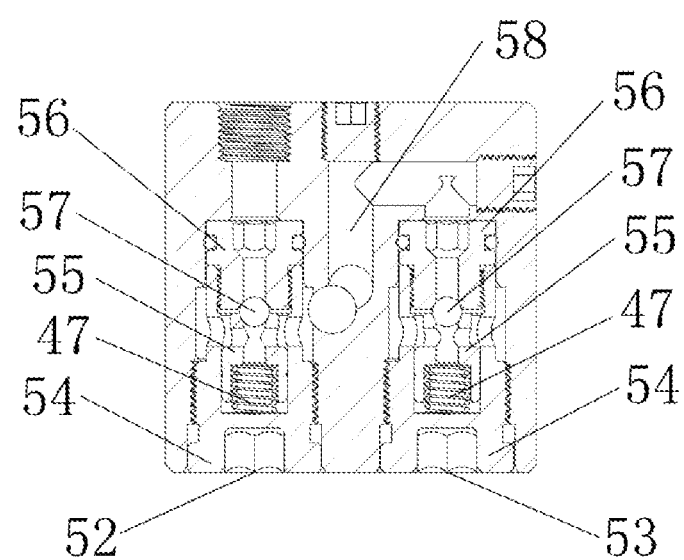
FIG. 6 is a sectional view of the bottom of the metering pump of the present invention.
Figure 7:
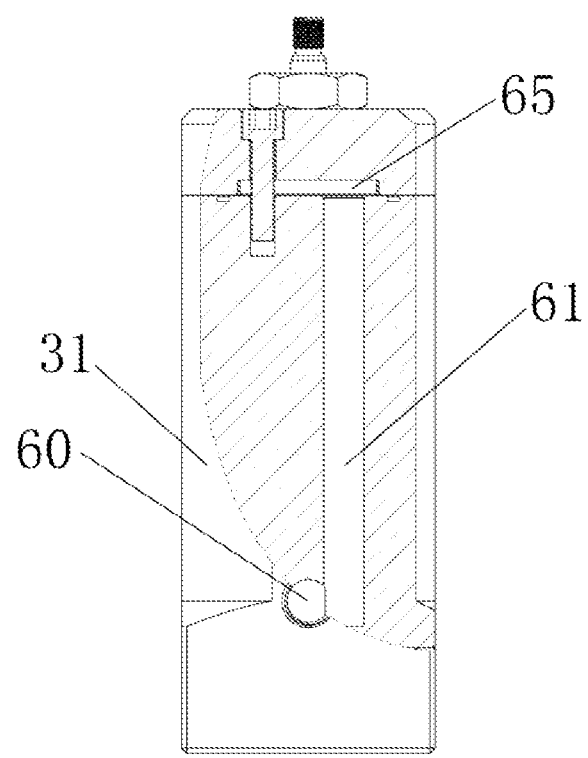
FIG. 7 is a sectional view of a water passage of the present invention.
Figure 8:
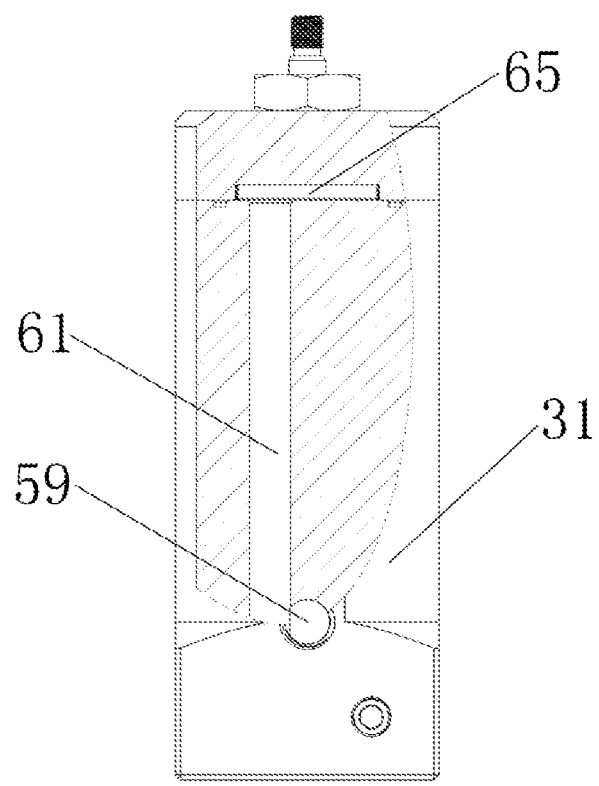
FIG. 8 is another sectional view of the water passage of the present invention.
Figure 9:
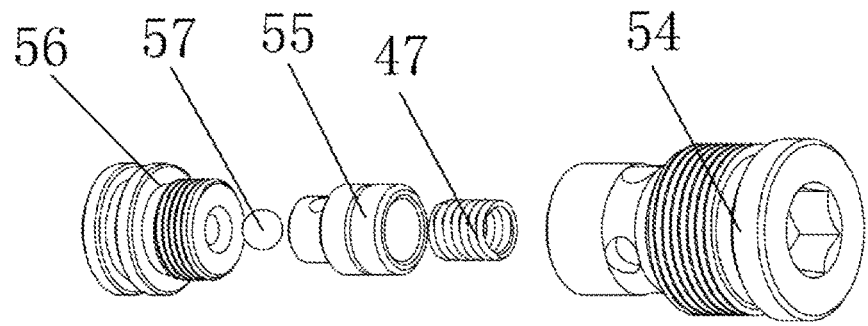
FIG. 9 is a structural view of an internal one-way valve of the present invention.
Figure 10:
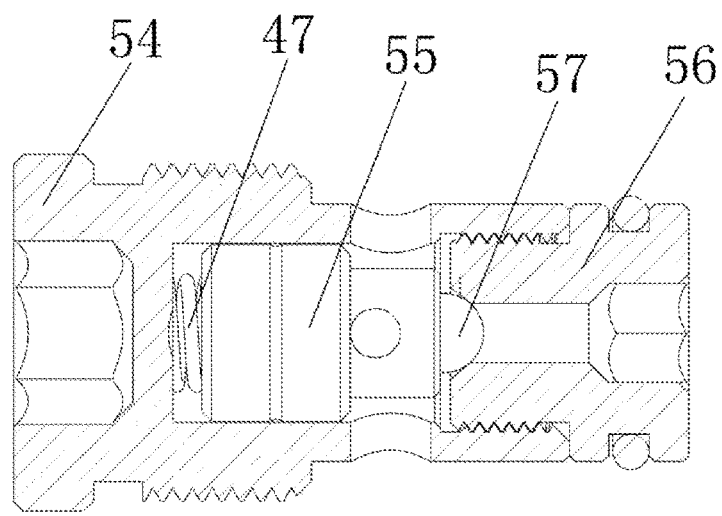
FIG. 10 is an assembling view of the internal one-way valve of the present invention.

Embodiment: A metering device for metering carbon dioxide flow, as shown in FIG. 1-FIG. 7, includes a transverse plate, a metering pump and a mounting plate. The transverse plate is provided with a scale. The transverse plate is provided with a sliding block. The sliding block is provided with a pointer. The mounting plate is formed with a plurality of bolt holes. The metering pump is connected with the mounting plate through bolts, and one end of the metering pump is connected with the sliding block. The metering pump includes a cylinder, an upper cover, a piston rod, a cylinder sleeve and an inner one-way valve, wherein the cylinder is internally provided with an accommodating cavity; the cylinder sleeve is disposed in the accommodating cavity; the upper cover is connected with the cylinder through a hexagon socket screw; the upper cover is connected with an upper cover interface; the upper cover interface is embedded in the cylinder, and the bottom of the upper cover interface touches the top of the cylinder sleeve. The upper cover interface is formed with a carbon dioxide discharge hole. The cylinder is internally provided with a No. 1 discharge pipe. The carbon dioxide discharge hole communicates with the No. 1 discharge pipe. The upper cover is formed with an annular groove at the bottom and an inner threaded hole on the top. An upper cover nut is disposed at the inner threaded hole. The upper cover nut is formed with a hole. The upper cover nut is connected with a nut interface. The outer wall of the nut interface is formed with external screw threads. The inner threaded hole on the upper cover is matched with the nut interface. The nut interface is screwed and embedded into the inner threaded hole. The two ends of the piston rod are respectively provided with screw threads. The piston rod is divided into a piston upper part and a piston lower part; the piston upper part and the piston lower part are both circular columns; and the diameter of the piston upper part is a little greater than the diameter of the piston lower part. The piston rod is disposed in the cylinder sleeve. The piston upper part passes through the upper cover interface, the upper cover, the nut interface and the upper cover nut in turn, and the end portion of the piston upper part extends out of the upper cover nut. The piston upper part is sleeved with a flat gasket and a spring. The flat gasket and the spring are disposed in the upper cover interface. The piston lower part is sleeved with a flat gasket, a spring, a premixed seal and an M5 nut in turn from the top down. The flat gasket and the cylinder sleeve form an upper pump cavity and a lower pump cavity. The upper pump cavity communicates with the carbon dioxide discharge hole on the upper cover interface. The cylinder is formed with a carbon dioxide inlet and a carbon dioxide outlet at the bottom. The inner one-way valve is formed with screw threads. The inner one-way valve is screwed and embedded into the carbon dioxide inlet and outlet. The carbon dioxide outlet also communicates with the No. 1 discharge pipe.

The inner one-way valve includes an inner one-way valve body, a valve core and an inner one-way valve base; the inner one-way valve base is screwed together with the inner one-way valve body; the valve core is disposed in the inner one-way valve body; a check ball is disposed between the inner one-way valve base and the valve core; and a spring is disposed between the valve core and the inner one-way valve body.

The two inner one-way valves are connected with a No. 2 discharge pipe there-between, and the No. 2 discharge pipe communicates with the lower pump cavity.

The cylinder is formed with a water passage entrance and a water passage exit on the outer wall; the cylinder is internally formed with three water passages; the water passages are not connected with one another, and communicate with one another in the annular groove at the bottom of the upper cover.

The cylinder is also formed with a plurality of auxiliary holes on the outer wall, and chock plugs are disposed at the auxiliary holes.

A method for metering carbon dioxide flow includes the following steps: step (1), pulling the piston rod to move the piston rod upward, wherein in this process, the lower pump cavity is internally vacuumed, the inner one-way valve at the carbon dioxide inlet opens while the inner one-way valve at the carbon dioxide outlet closes, and liquefied carbon dioxide flows into the lower pump cavity via the No. 2 discharge pipe; step (2), pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet, wherein the carbon dioxide outlet communicates with the No. 1 discharge pipe, so a part of the liquefied carbon dioxide in the lower pump cavity passes through the No. 1 discharge pipe and the carbon dioxide discharge hole in turn and then flows into the upper pump cavity; step (3), pulling the piston rod to move the piston rod upward, wherein in this process, the lower pump cavity is internally vacuumed, the inner one-way valve at the carbon dioxide inlet opens while the inner one-way valve at the carbon dioxide outlet closes, the liquefied carbon dioxide flows into the lower pump cavity via the No. 2 discharge pipe, and at the same time, the liquefied carbon dioxide in the upper pump cavity passes through the carbon dioxide discharge hole and the No. 1 discharge pipe in turn and flows out of the carbon dioxide outlet; step (4), pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet, and a part of the liquefied carbon dioxide in the lower pump cavity passes through the No. 1 discharge pipe and the carbon dioxide discharge hole in turn and flows into the upper pump cavity; and step (5), pulling the piston rod repeatedly such that the piston rod moves up and down in a reciprocating way to deliver the liquefied carbon dioxide quantitatively.

A polyurethane foaming machine corresponding to the metering device includes an isocyanate branch, a premixed polyether branch, a carbon dioxide branch and a premixing spray gun; the isocyanate branch consists of an isocyanate tank, an isocyanate equipment tank, a primary feed pump, a secondary feed pump and an isocyanate delivery pipe; the premixed polyether branch consists of a premixed polyether tank, a premixed polyether equipment tank, a primary feed pump, a secondary feed pump and a premixed polyether delivery pipe; and the carbon dioxide branch includes a carbon dioxide tank, a carbon dioxide equipment tank, a booster pump, a metering device and a carbon dioxide delivery pipe. At the entrance of the premixed polyether equipment tank, the carbon dioxide delivery pipe communicates with the premixed polyether delivery pipe. The carbon dioxide is dissolved in the premixed polyether to generate a mixture. The isocyanate and the mixture are converged in the premixing spray gun through the delivery pipe. The secondary feed pump and the metering device are controlled by the same driver. The isocyanate equipment tank and the premixed polyether tank are respectively internally provided with a heating device. A pressure switch is respectively disposed at the entrance of the isocyanate equipment tank and at the entrance of the premixed polyether equipment tank. The carbon dioxide branch also includes a reducing valve, a one-way valve and two solenoid valves; the reducing valve and one of the solenoid valves are disposed between the carbon dioxide equipment tank and the booster pump in turn; the other one of the solenoid valves is disposed between the metering pump mechanism and the carbon dioxide equipment tank; and the one-way valve is disposed at the rear end of the metering device. The carbon dioxide equipment tank is respectively provided with a compressor, a cooler and a throttle valve. The booster pump is connected with a pressure sensor. A pressure control valve and a pressure sensor are in connection with and located between the premixed polyether equipment tank and the premixing spray gun.

A method for making polyurethane foam using the polyurethane foaming machine includes the following steps. Step (1), a great amount of liquefied carbon dioxide and a small amount of gasified carbon dioxide exists in the carbon dioxide tank; the carbon dioxide is decompressed by using the reducing valve to generate carbon dioxide gas; the carbon dioxide gas is pumped into the carbon dioxide equipment tank through the booster pump. Step (2), the compressor and cooler on the carbon dioxide equipment tank start working to compress, cool and continuously liquefy the carbon dioxide gas, and when the carbon dioxide equipment tank reaches a certain pressure inside, the pressure sensor controls the booster pump to stop working. Step (3), the liquefied carbon dioxide in the carbon dioxide equipment tank is pumped into the premixed polyether delivery pipe in a fixed ratio through the metering pump; the carbon dioxide is dissolved in the polyether to form a mixture; the metering pump starts working while the secondary feed pump also starts working; the isocyanate in the isocyanate tank is pumped into the isocyanate equipment tank through the primary feed pump and the secondary feed pump; the premixed polyether in the premixed polyether tank is pumped into the premixed polyether equipment tank through the primary feed pump and the secondary feed pump; and the metering pump and the secondary feed pump are controlled by the same driver to deliver the isocyanate, premixed polyether and carbon dioxide into an equipment tank at the same time. Step (4), the heating devices on the isocyanate equipment tank and the premixed polyether equipment tank start working to respectively heat and thin the isocyanate and the carbon dioxide-contained premixed polyether such that the isocyanate and the carbon dioxide-contained premixed polyether are mixed well. Step (5), the isocyanate and the carbon dioxide-contained premixed polyether are respectively delivered to the premixing spray gun at a fixed ratio and mixed; the mixture is homogenized and then sprayed out; after a period of time, the spray is cured to form the polyurethane foam.

Finally, it should be noted that the above embodiments are merely representative examples of the present invention. Obviously, the present invention is not limited to the above embodiments, and may have various modifications. Any simple changes, equivalent changes and modifications made on the basis of the technical principle of the above embodiments of the present invention shall fall within the scope of the technical solution of the present invention.

What is claimed is:

1. A metering device for metering carbon dioxide flow, comprising a transverse plate, a metering pump and a mounting plate, characterized in that:
    the transverse plate is provided with a scale;
    the transverse plate is provided with a sliding block;
    the sliding block is provided with a pointer;
    the mounting plate is formed with a plurality of bolt holes;
    the metering pump is connected with the mounting plate through bolts, and one end of the metering pump is connected with the sliding block; the metering pump comprises a cylinder, an upper cover, a piston rod, a cylinder sleeve and an inner one-way valve, wherein the cylinder is internally provided with an accommodating cavity;
    the cylinder sleeve is disposed in the accommodating cavity;
    the upper cover is connected with the cylinder through a hexagon socket screw;
    the upper cover is connected with an upper cover interface;
    the upper cover interface is embedded in the cylinder, and the bottom of the upper cover interface touches the top of the cylinder sleeve;
    the upper cover interface is formed with a carbon dioxide discharge hole;
    the cylinder is internally provided with a No. 1 discharge pipe;
    the carbon dioxide discharge hole communicates with the No. 1 discharge pipe;
    the upper cover is formed with an annular groove at the bottom and an inner threaded hole on the top;
    an upper cover nut is disposed at the inner threaded hole;
    the upper cover nut is formed with a hole; the upper cover nut is connected with a nut interface;
    the outer wall of the nut interface is formed with external screw threads;
    the inner threaded hole on the upper cover is matched with the nut interface;
    the nut interface is screwed and embedded into the inner threaded hole;
    the two ends of the piston rod are respectively provided with screw threads;
    the piston rod is divided into a piston upper part and a piston lower part;
    the piston upper part and the piston lower part are both circular columns;
    the diameter of the piston upper part is greater than the diameter of the piston lower part;
    the piston rod is disposed in the cylinder sleeve;
    the piston upper part passes through the upper cover interface, the upper cover, the nut interface and the upper cover nut in turn, and the end portion of the piston upper part extends out of the upper cover nut;
    the piston upper part is sleeved with a flat gasket and a spring;
    the flat gasket and the spring are disposed in the upper cover;
    the piston lower part is sleeved with a flat gasket, a spring, a premixed seal and an M5 nut in turn from the top down;
    the flat gasket and the cylinder sleeve form an upper pump cavity and a lower pump cavity;
    the upper pump cavity communicates with the carbon dioxide discharge hole on the upper cover interface;
    the cylinder is formed with a carbon dioxide inlet and a carbon dioxide outlet at the bottom;
    the inner one-way valve is formed with screw threads;
    the inner one-way valve is screwed and embedded into the carbon dioxide inlet and outlet; and
    the carbon dioxide outlet also communicates with the No. 1 discharge pipe.

2. The metering device for metering carbon dioxide flow according to claim 1, characterized in that the inner one-way valve includes an inner one-way valve body, a valve core and an inner one-way valve base; the inner one-way valve base is screwed together with the inner one-way valve body; the valve core is disposed in the inner one-way valve body; a check ball is disposed between the inner one-way valve base and the valve core; and a spring is disposed between the valve core and the inner one-way valve body.

3. The metering device for metering carbon dioxide flow according to claim 1, characterized in that two inner one-way valves are connected with a No. 2 discharge pipe there-between, and the No. 2 discharge pipe communicates with the lower pump cavity.

4. The metering device for metering carbon dioxide flow according to claim 1, characterized in that the cylinder is formed with a water passage entrance and a water passage exit on the outer wall; the cylinder is internally formed with three water passages; the water passages are not connected with one another, and communicate with one another in the annular groove at the bottom of the upper cover.

5. The metering device for metering carbon dioxide flow according to claim 1, characterized in that the cylinder is also formed with a plurality of auxiliary holes on the outer wall, and chock plugs are disposed at the auxiliary holes.

6. The metering device for metering carbon dioxide flow according to claim 1, characterized in that a method for metering carbon dioxide flow comprises the following steps:
    (1) pulling the piston rod to move the piston rod upward, wherein in this process, the lower pump cavity is internally vacuumed, the inner one-way valve at the carbon dioxide inlet opens while the inner one-way valve at the carbon dioxide outlet closes, and liquefied carbon dioxide flows into the lower pump cavity via the No. 2 discharge pipe;
    (2) pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet; wherein the carbon dioxide outlet communicates with the No. 1 discharge pipe, so a part of the liquefied carbon dioxide in the lower pump cavity passes through the No. 1 discharge pipe and the carbon dioxide discharge hole in turn and then flows into the upper pump cavity;

(3) pulling the piston rod to move the piston rod upward, wherein in this process, the lower pump cavity is internally vacuumed, the inner one-way valve at the carbon dioxide inlet opens while the inner one-way valve at the carbon dioxide outlet closes, the liquefied carbon dioxide flows into the lower pump cavity via the No. 2 discharge pipe, and at the same time, the liquefied carbon dioxide in the upper pump cavity passes through the carbon dioxide discharge hole and the No. 1 discharge pipe in turn and flows out of the carbon dioxide outlet;

(4) pulling the piston rod to move the piston rod downward, wherein in this process, the inner one-way valve at the carbon dioxide inlet closes while the inner one-way valve at the carbon dioxide outlet opens, the liquefied carbon dioxide in the lower pump cavity flows out via the carbon dioxide outlet, and a part of the liquefied carbon dioxide in the lower pump cavity passes through the No. 1 discharge pipe and the carbon dioxide discharge hole in turn and flows into the upper pump cavity;

(5) pulling the piston rod repeatedly such that the piston rod moves up and down in a reciprocating way to deliver the liquefied carbon dioxide quantitatively.

* * * * *